(12) United States Patent
Lee et al.

(10) Patent No.: US 10,048,409 B2
(45) Date of Patent: Aug. 14, 2018

(54) OPTICAL FILM AND DISPLAY DEVICE COMPRISING THE SAME

(71) Applicant: SAMSUNG DISPLAY CO., LTD., Yongin, Gyeonggi-do (KR)

(72) Inventors: Hee Hwan Lee, Hwaseong-si (KR); Je Won Yoo, Seoul (KR); Seung In Baek, Seoul (KR); Ju Youn Son, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 184 days.

(21) Appl. No.: 15/084,995

(22) Filed: Mar. 30, 2016

(65) Prior Publication Data
US 2017/0052287 A1   Feb. 23, 2017

(30) Foreign Application Priority Data
Aug. 17, 2015 (KR) .................. 10-2015-0115562

(51) Int. Cl.
G02B 3/02 (2006.01)
G02B 3/00 (2006.01)
G02F 1/1335 (2006.01)
G02B 6/00 (2006.01)

(52) U.S. Cl.
CPC ............ G02B 3/005 (2013.01); G02B 6/00 (2013.01); G02F 1/133526 (2013.01)

(58) Field of Classification Search
CPC ...................................... G02B 3/005
USPC ........................................... 359/708
See application file for complete search history.

(56) References Cited

U.S. PATENT DOCUMENTS

| 5,555,476 A * | 9/1996 | Suzuki ............... G02B 3/005 |
| | | 349/110 |
| 7,599,117 B2 | 10/2009 | Goto |
| 8,698,985 B2 | 4/2014 | Park et al. |
| 8,717,519 B2 | 5/2014 | Park et al. |

FOREIGN PATENT DOCUMENTS

| JP | 2008233824 A | 10/2008 |
| KR | 101200768 B1 | 11/2012 |
| KR | 1020140137954 A | 12/2014 |
| KR | 1020160074763 | 6/2016 |

* cited by examiner

Primary Examiner — James Jones
(74) Attorney, Agent, or Firm — Cantor Colburn LLP

(57) ABSTRACT

An optical film includes a base film including a base and first and second lens pattern portions, where the first lens pattern portion includes a first surface, a first side surface, which extends from one side of the first surface to a surface of the base and a second side surface, which extends from the other side of the first surface and the surface of the base, the second lens pattern portion includes a second surface, a third side surface, which extends from one side of the second surface to the surface of the base, and a fourth side surface, which extends from the other side of the second surface and the surface of the base, and an angle between an imaginary line and the surface of the base is less than about 50 degrees.

20 Claims, 15 Drawing Sheets

OPTICAL FILM AND DISPLAY DEVICE COMPRISING THE SAME

This application claims priority to Korean Patent Application No. 10-2015-0115562 filed on Aug. 17, 2015, and all the benefits accruing therefrom under 35 U.S.C. § 119, the content of which in its entirety is herein incorporated by reference.

BACKGROUND

1. Field

Exemplary embodiments of the invention relate to an optical film and a display device comprising the same.

2. Description of the Related Art

The importance of display devices has steadily grown with recent developments in multimedia technology. As a result, a variety of display devices such as a liquid crystal display ("LCD"), an organic light-emitting diode ("OLED"), and the like have been developed and widespread.

An LCD may include two substrates, which have thin-film transistors ("TFTs"), pixel electrodes and a common electrode disposed thereon and face each other, and a liquid crystal layer, which is interposed between the two substrates. Examples of a driving mode of the liquid crystal layer include a twisted nematic ("TN") mode and an electrically controlled birefringence ("ECB") mode. Examples of the ECB mode include a vertical alignment ("VA") mode, an optically compensated bend ("OCB") mode, and an in-plane switching ("IPS") mode. As an example of a driving method of the LCD, liquid crystal molecules in a liquid crystal layer may be aligned at an angle less than 90 degrees with respect to the pixel electrodes or the common electrode so as to realize an image that gradually becomes brighter.

Recently, research is being conducted on ways to widen not only the front viewing angle, but also the side viewing angle of the LCD.

SUMMARY

Exemplary embodiments provide electronic devices including stretchable wirings. Additional exemplary embodiments will be set forth in the detailed description which follows, and, in part, will be apparent from the invention, or may be learned by practice of the invention.

However, exemplary embodiments of the invention are not restricted to those set forth herein. The above and other exemplary embodiments of the invention will become more apparent to one of ordinary skill in the art to which the invention pertains by referencing the detailed description of the invention given below.

An exemplary embodiment of the invention, an optical film includes a base film including a base and first and second lens pattern portions, which protrude from a surface of the base in a first direction to be spaced apart from each other, and a cover film disposed on the base film, where the first lens pattern portion includes a first surface, a first side surface, which extends from one side of the first surface to the surface of the base, and a second side surface, which extends from the other side of the first surface and the surface of the base, the second lens pattern portion includes a second surface, a third side surface, which extends from one side of the second surface to the surface of the base, and a fourth side surface, which extends from the other side of the second surface and the surface of the base, and an angle between an imaginary line, which is drawn from a point of contact between the second side surface and the first surface and a point of contact between the third side surface and the surface of the base, and the surface of the base is less than 50 degrees (°).

In an exemplary embodiment, a refractive index of the base film may be lower than a refractive index of the cover film.

In an exemplary embodiment, a difference between a refractive index of the cover film and a refractive index of the base film may be about 0.03 to about 0.2.

In an exemplary embodiment, a distance from a point of contact between the second side surface and the surface of the base to a point of contact between the third side surface and the surface of the base may be proportional to a height of the first lens pattern portion and inversely proportional to the angle.

In an exemplary embodiment, the cover film may include first and second engraved pattern portions, which contact the first and second lens pattern portions.

In an exemplary embodiment, when the base film has a refractive index of about 1.2 to about 1.6 and the cover film has a refractive index of about 1.5 to about 2, the angle may be 40° or lower.

An exemplary embodiment of the invention, an optical film include a cover film including first and second engraved pattern portions, which are spaced apart from each other, where the first engraved pattern portion includes a first surface, a first side surface, which extends from one side of the first surface to a surface of the cover film, and a second side surface, which extends from the other side of the first surface and the surface of the cover film, the second engraved pattern portion includes a second surface, a third side surface, which extends from one side of the second surface to the surface of the cover film, and a fourth side surface, which extends from the other side of the second surface and the surface of the cover film, and an angle between an imaginary line, which is drawn from a point of contact between the second side surface and the first surface and a point of contact between the third side surface and the surface of the cover film, and the surface of the cover film is less than 50°.

In an exemplary embodiment, a refractive index of the cover film may be about 1.53 to about 1.57.

In an exemplary embodiment, a distance from a point of contact between the second side surface and the surface of the cover film to a point of contact between the third side surface and the surface of the cover film may be greater than a value obtained by dividing a height of the first engraved pattern portion by the tangent value of the angle.

In an exemplary embodiment, the optical film may further include a base film disposed on the surface of the cover film.

In an exemplary embodiment, the optical film may further include an air layer filling gaps between the base film and the first and second engraved pattern portions.

In an exemplary embodiment, a refractive index of the cover film may be higher than a refractive index of the air layer.

In an exemplary embodiment, an exemplary embodiment of the invention, a display device includes a display panel, and an optical film comprising a base film, including a base and first and second lens pattern portions, which protrude from a surface of the base in a first direction to be spaced apart from each other, and a cover film disposed on the base film and having a different refractive index from that of the base film, where the first lens pattern portion includes a first surface, a first side surface, which extends from one side of the first surface to the surface of the base, and a second side surface, which extends from the other side of the first surface and the surface of the base, the second lens pattern portion includes a second surface, a third side surface, which extends from one side of the second surface to the surface of the base, and a fourth side surface, which extends from the other side of the second surface and the surface of the base, and an angle between an imaginary line, which is drawn from a point of contact between the second side surface and the first surface and a point of contact between the third side surface and the surface of the base, and the surface of the base is less than about 50°.

In an exemplary embodiment, a distance from a point of contact between the second side surface and a surface of the cover film to a point of contact between the third side surface and the surface of the cover film may be proportional to a height of the first lens pattern portion and inversely proportional to the angle.

In an exemplary embodiment, a distance from a point of contact between the second side surface and the surface of the cover film to a point of contact between the third side surface and the surface of the cover film may be greater than a value obtained by dividing a height of the first engraved pattern portion by the tangent value of the angle.

In an exemplary embodiment, a refractive index of the cover film may be higher than a refractive index of the base film.

In an exemplary embodiment, a refractive index of the cover film may be about 1.53 to about 1.57 and a refractive index of the base film is about 1.42 to about 1.5.

In an exemplary embodiment, when the base film has a refractive index of about 1.2 to about 1.6 and the cover film has a refractive index of about 1.5 to about 2, the angle may be about 40° or lower.

In an exemplary embodiment, the first and second lens pattern portions may be polygonal, semicircular, semielliptical in a cross-sectional view.

In an exemplary embodiment, the first and second lens pattern portions may have an aspect ratio of 0.5 to 1.6.

According to the exemplary embodiments, it is possible to improve the contrast ratio ("CR") and visibility of a display device.

In addition, it is possible to provide an excellent side viewing angle while offering excellent front luminance.

Other features and exemplary embodiments will be apparent from the following detailed description, the drawings, and the claims.

BRIEF DESCRIPTION OF THE DRAWINGS

The accompanying drawings, which are included to provide a further understanding of the invention, and are incorporated in and constitute a part of this specification, illustrate exemplary embodiments of the invention, and, together with the description, serve to explain principles of the invention.

DETAILED DESCRIPTION

Figure 1:
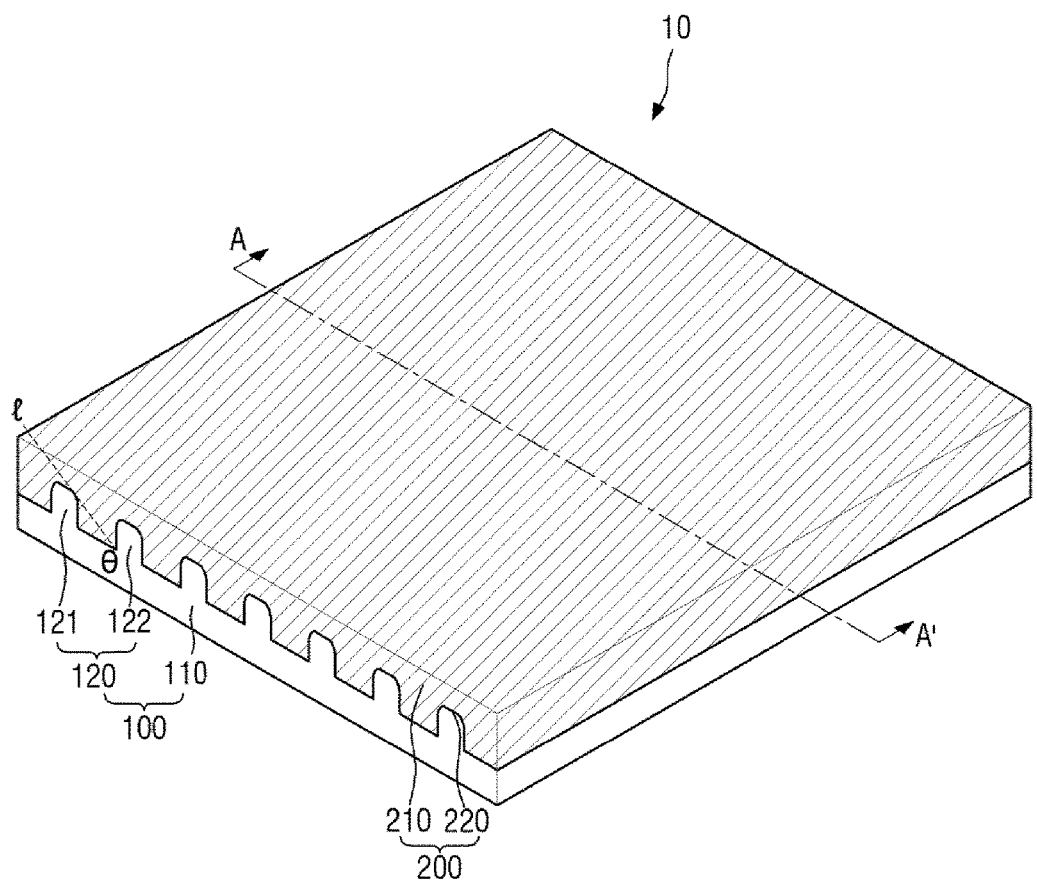
FIG. 1 is a perspective view of an exemplary embodiment of an optical film according to the invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region provided by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, exemplary embodiments will be described with reference to the accompanying drawings.

FIG. 1 is a perspective view of an optical film 10 according to an exemplary embodiment of the invention.

Referring to FIG. 1, the optical film 10 may include a base film 100 and a cover film 200.

The base film 100 may include a first base 110 and a plurality of lens pattern portions 120, which protrude from the first base 110 in a first direction (e.g., a vertical direction). The lens pattern portions 120 may be spaced apart from one another and may be disposed on the first base 110. The lens pattern portions 120 may include a first lens pattern portion 121 and a second pattern portion 122, and this will be described later in detail with reference to FIG. 2.

The cover film 200 may be coupled to the base film 100. The cover film 200 may include a second base 210, and a plurality of engraved pattern portions 220 may be engraved in the second base 220 in the first direction. The shape of the engraved pattern portions 220 may be symmetrical to the shape of the lens pattern portions 120 such that the engraved pattern portions 220 fit the lens pattern portions 120, and this will be described later in detail with reference to FIG. 3.

The base film 100 may have a different refractive index from that of the cover film 200. More specifically, the base film 100 may have a lower refractive index than that of the cover film 200. In an exemplary embodiment, the difference between the refractive index of the base film 100 and the refractive index of the cover film 200 may be about 0.03 to about 0.15, for example. When applied in a display device, the optical film 10 may increase the front luminance of the display device and at the same time, widen the side viewing angle of the display device.

Figure 2:
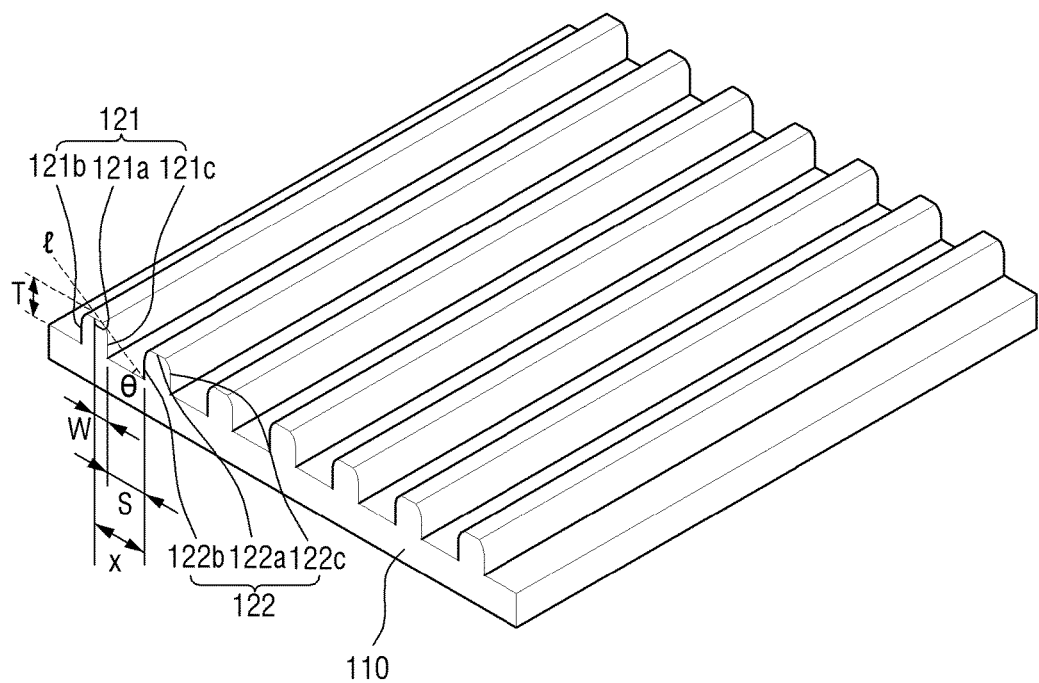
FIG. 2 is a perspective view of an example of a base film of the optical film of FIG. 1.

FIG. 2 is a perspective view of an example of the base film 100 of the optical film 10 of FIG. 1.

Referring to FIG. 2, the base film 100 may include the first base 110 and the lens pattern portions 120 (refer to FIG. 1), which protrude from the first base 110. The lens pattern portions 120 may be disposed on the first base 110 to be isolated from, and in parallel to, one another.

The first base 110 may include a material capable of transmitting light therethrough. In an exemplary embodiment, the first base 110 may include a photo-curable resin or a thermosetting resin, for example. The first base 110 and the lens pattern portions 120 may be unitary and include the same material.

Each of the lens pattern portions 120 may have a first surface and curved surfaces, which extend from both sides of the first surface. In an exemplary embodiment, the first surfaces of the lens pattern portions 120 may be provided to be in parallel to a first surface of the first base 110. The lens pattern portions 120 may include the first lens pattern portion 121 and the second lens pattern portion 122.

The first lens pattern portion 121 may include a first surface 121a, a first side surface 121b, and a second side surface 121c. In an exemplary embodiment, the first surface 121a may be provided to be in parallel to the first base 110, but the invention is not limited thereto. The first side surface 121b may extend from one side of the first surface 121a to the first surface of the first base 110. The second side surface 121c may extend from the other side of the first surface 121a to the first surface of the first base 110. In an exemplary embodiment, the first and second side surfaces 121b and 121c may be symmetrical in shape to each other, but the invention is not limited thereto. In an exemplary embodiment, the first and second side surfaces 121b and 121c may have a curved profile or a straight line profile, for example.

The second lens pattern portion 122 may include a second surface 122a, a third side surface 122b, and a fourth side surface 122c. In an exemplary embodiment, the second surface 122a may be provided to be in parallel to the first base 110, but the invention is not limited thereto. The third side surface 122b may extend from one side of the second surface 122a to the first surface of the first base 110. The fourth side surface 122c may extend from the other side of the second surface 122a to the first surface of the first base 110. In an exemplary embodiment, the third and fourth side surfaces 122b and 122c may be symmetrical in shape to each other, but the invention is not limited thereto. In an exemplary embodiment, the third and fourth side surfaces 122b and 122c may have a curved profile or a straight line profile. That is, the first lens pattern portion 121 and the second lens pattern portion 122 may have the same shape, the same length in a direction in which the first lens pattern portion 121 and the second lens pattern portion 122 extend, and the same height T in the first direction.

Figure 4:
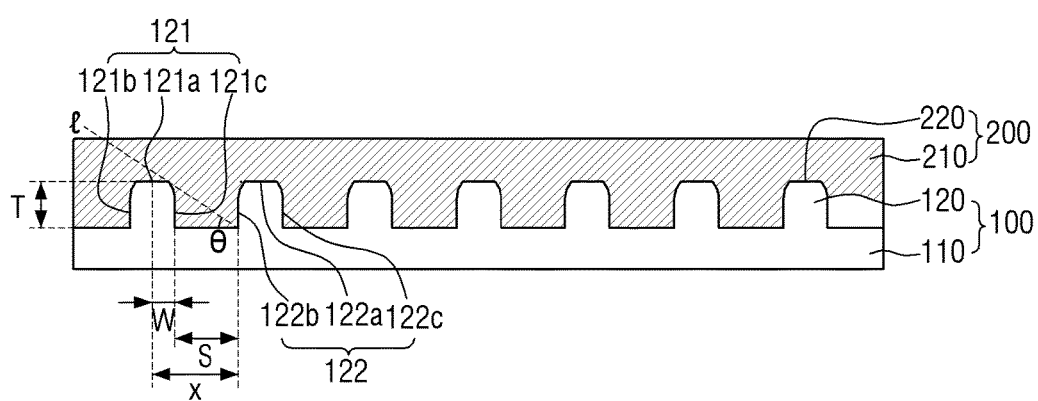
FIG. 4 is a cross-sectional view of the optical film of FIG. 1, taken along line A-A' of FIG. 1.

In an exemplary embodiment, when an imaginary line l is drawn between a point of contact between the first surface 121a and the second side surface 121c of the first lens pattern portion 121 and a point of contact between the third side surface 122b of the second lens pattern portion 122 and the first surface of the first base 110, a first angle θ between the imaginary line l and the first surface of the first base 110 may be greater than about 0 degree)(° and less than about 50°, for example, and this will be described later in detail with reference to FIG. 4.

In an exemplary embodiment, the base film 100 may be provided by forming through molding a resin film that satisfies the range of refractive indices of about 1.42 to about 1.5 using a mold corresponding to the shape of the lens pattern portions 120, but the invention is not limited thereto, for example. That is, the base film 100 may be provided by imprinting.

Figure 3:
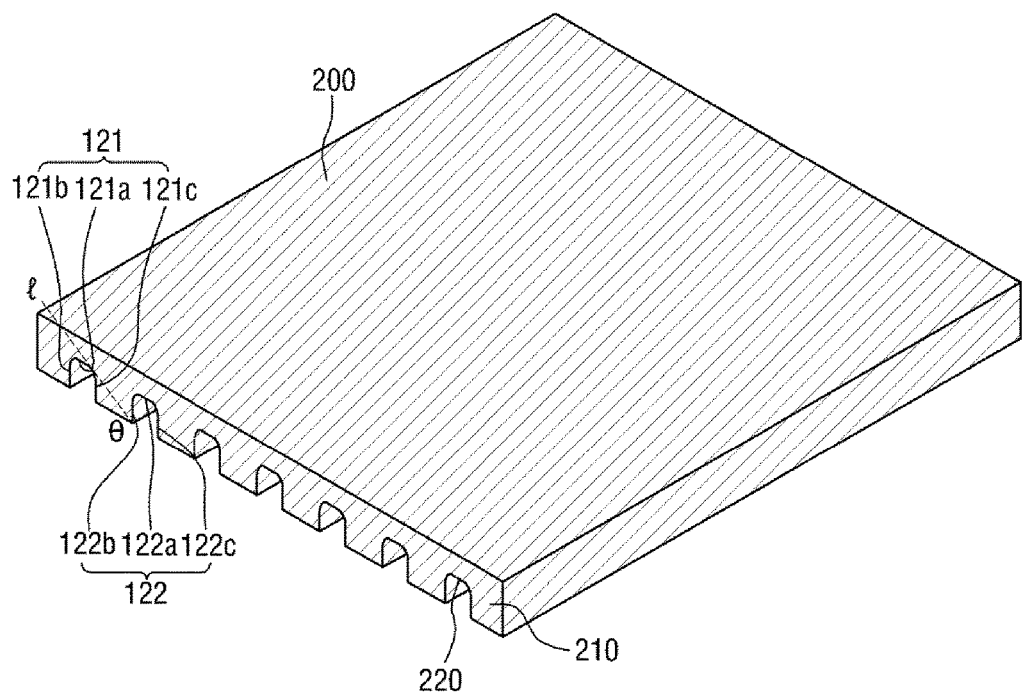
FIG. 3 is a perspective view of an example of a cover film of the optical film of FIG. 1.

FIG. 3 is a perspective view of an example of the cover film 200 of the optical film 10 of FIG. 1.

Referring to FIG. 3, the cover film 200 may include the second base 210 and the engraved pattern portions 220. The engraved pattern portions 220 may have a shape corresponding to the shape of the lens pattern portions 120 so as to fit the lens pattern portions 120.

The cover film 200 may be provided by applying and curing a resin that satisfies the range of refractive indices of about 1.53 to about 1.57 onto a surface where the lens pattern portions 120 are provided, but the invention is not limited thereto. That is, the cover film 200 in which the engraved pattern portions 220 are engraved may be prepared first and may then be disposed on or attached onto the base film 100.

The resin used to form the cover film 200 may be an ultraviolet ("UV")-curable resin or a thermosetting resin. Accordingly, the optical film 10 may be provided by a curing method, as described above. In an exemplary embodiment, the base film 100, like the cover film 200, may include a UV-curable resin or a thermosetting resin, for example, and may further include a fluorine-based resin so as to have the aforementioned range of refractive indices.

FIG. 4 is a cross-sectional view of the optical film 10 of FIG. 1, taken along line A-A' of FIG. 1.

Referring to FIG. 4, when the imaginary line l is drawn between the point of contact between the first surface 121a and the third side surface 121c of the first lens pattern portion 121 and the point of contact between the third side surface 122b of the second lens pattern portion 122 and the first surface of the first base 110, the first angle θ between the imaginary line l and the first surface of the first base 110 may be greater than about 0 degree and smaller than about 50°, for example.

The first angle θ may be represented by Equation 1:

$$\theta = \sin^{-1}(L/H * \sin(90 - \sin^{-1}(1/L))) \quad (1)$$

where L denotes the refractive index of the base film 100 and H denotes the refractive index of the cover film 200.

In an exemplary embodiment, when the first angle θ is less than about 47°, the refractive index of the base film 100 may be about 1.5, and the refractive index of the cover film 200 may be about 1.53, for example. In another exemplary embodiment, when the first angle θ is less than about 40°, the refractive index of the base film 100 may be about 1.42, and the refractive index of the cover film 200 may be about 1.57, for example. However, the invention is not limited to these exemplary embodiments. That is, the refractive index of the base film 100 may be about 1.2 to about 1.6, and the refractive index of the cover film 200 may be greater than the refractive index of the base film 100 and at the same time, satisfy the range of about 1.5 to about 2, for example.

A distance S between a point of contact between the second side surface 121c of the first lens pattern portion 121 and the first surface of the first base 110 and a point of contact between the third side surface 122b of the second lens pattern portion 122 and the first surface of the first base 110 may be proportional to the height T of the lens pattern portions 120, and inversely proportional to the tangent value of the first angle θ, i.e., tan θ. More specifically, the distance S may be greater than a value obtained by dividing the height T of the lens pattern portions 120 by tan θ. That is, the distance S may satisfy in equation (2):

$$S > T/\tan\theta \quad (2).$$

The distance S may be obtained by subtracting a distance x from the center of the first lens pattern portion 121 to the second lens pattern portion 122 from a distance W from the center to a side of the first lens pattern portion 121, and may also satisfy Equation (3):

$$y = -m(x - x0) + \quad (3)$$
$$y_0 \left\{ x_0 = \frac{a^2 m}{\sqrt{a^2 m^2 + b^{2*}}} \cdot y_0 = \frac{b}{a}\sqrt{a^2 - x_0^2} - d, m = \tan\theta \text{cut} \right\}$$
$$x = \frac{y_0}{m} + x_0 (\text{when } y = 0)$$
$$S = x - W$$

where x and y denote functions representing the imaginary line $x_0$ and $y_0$ denote the X- and Y-axis coordinates of the point of contact between the imaginary line l and the first surface 121a of the first lens pattern portion 121. That is, the distance S between the first lens pattern portion 121 and the second lens pattern portion 122 may be determined by the first angle θ, which is the angle between the imaginary line l and the first surface of the first base 110.

Accordingly, each of the lens pattern portions 120 provides light emitted at a relatively small angle through the side surfaces thereof having a relatively large angle relative to a perpendicular direction. Thus, when applied in a display device the optical film 10 may improve the side visibility of the display device.

Figure 5:
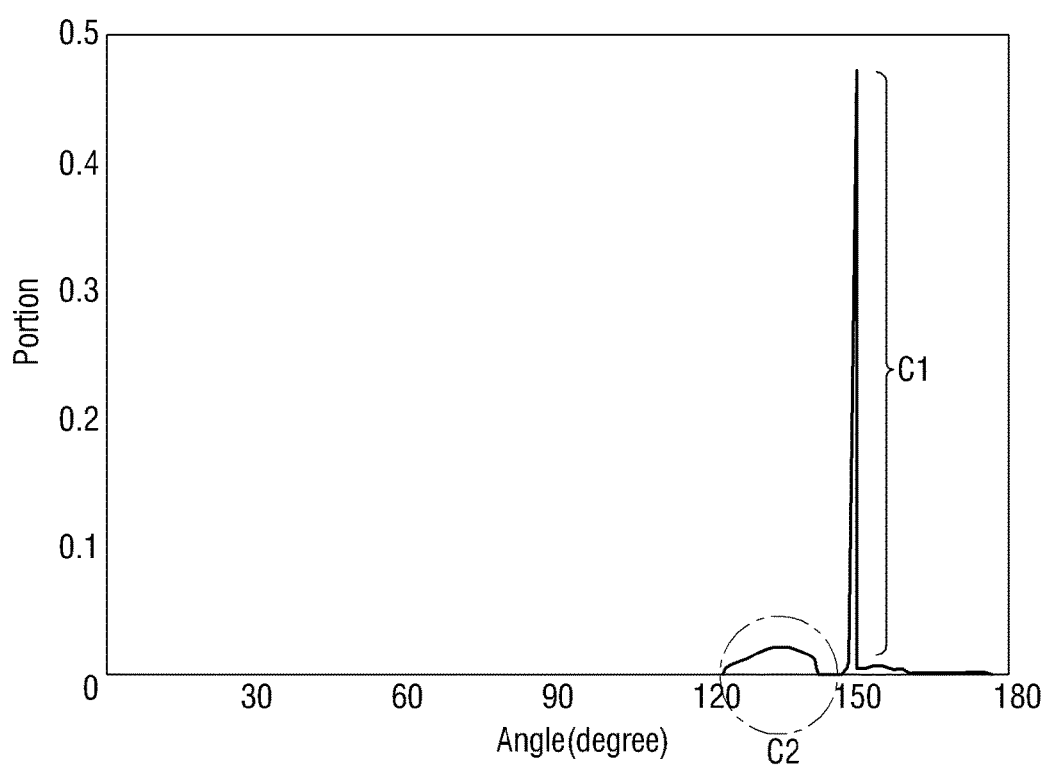
FIGS. 5 and 6 are schematic views for explaining the effects of the optical film of FIG. 1.
Figure 6:
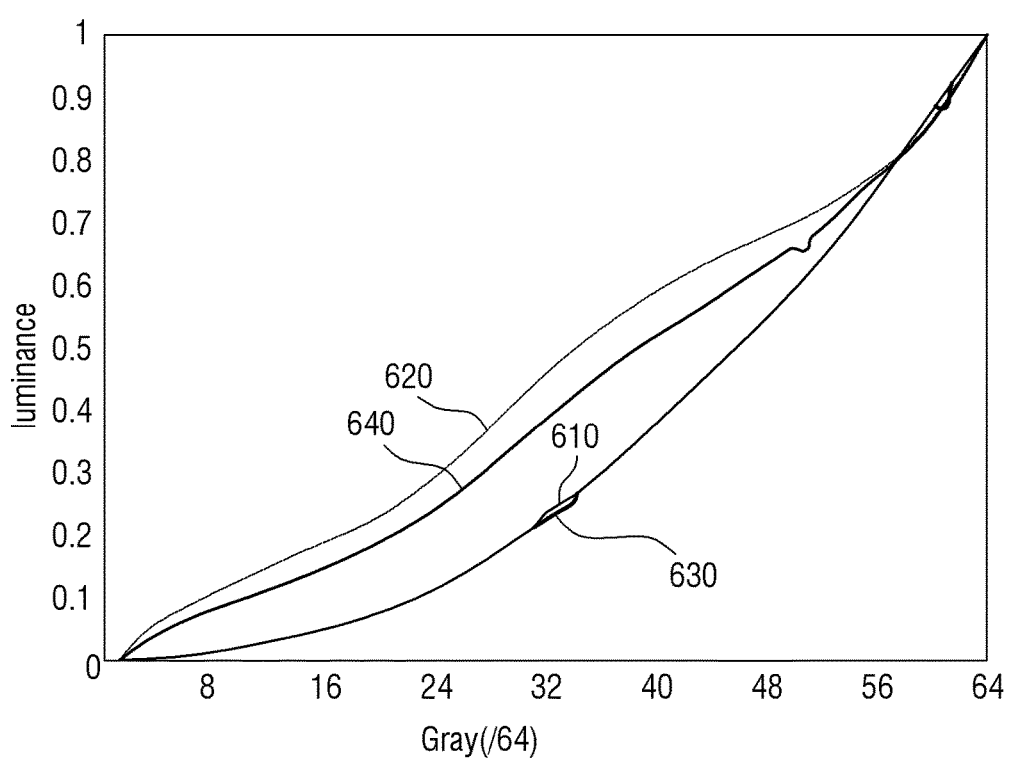

FIGS. 5 and 6 are schematic views for explaining the effects of the optical film 10 of FIG. 1. More specifically, FIG. 5 is a graph showing portions of beams of light emitted from a display device having a related-art optical film at a particular angle for various incidence angles, and FIG. 6 is a graph showing front and side gamma curves of the display device having the related-art optical film.

Oval lens portions of the related-art optical film changes the path of light emitted in a normal-line direction of a display panel to deviate from the normal-line direction and changes the path of light emitted not in the normal-line direction to coincide with the normal-line direction, thereby inducing color mixing so as to improve color shifts.

However, referring to FIG. 5, the portion size of side incident components C1 with an incidence angle of about 60° (i.e., 150° minus 90°) is greater than the portion size of side incidence components with an incidence angle of about 33° (i.e., 123° minus 90°) to about 52° (i.e., 142° minus 90°), for example. This means that the side incident components C2 contributes considerably less than the side incident components C1 to the improvement of visibility.

In the optical film 10, each of the first lens pattern portion 121 and the second lens pattern portion 122 includes the first surface 121a or the second surface 122a, but does not have an unnecessary part that does not much contribute to the improvement of visibility.

In a display device using the related-art optical film, black luminance at the front and black luminance on the sides, which is higher than the front black luminance, are coupled. As a result, the black luminance of the display device generally increases, and thus, the contrast ratio ("CR") of the display device decreases. More specifically, the related-art optical film couples some of the side luminance of the display device with the front luminance of the display device, regardless of grayscale. As a result, the white luminance of the display device decreases, and the black luminance of the display device increases. Accordingly, the CR of the display device decreases. One of the factors that increase black luminance is the existence of upper parts of the lens portions of the related-art optical film and the distance between the lens portions of the related-art optical film.

The optical film 10, unlike the related-art optical film, does not include upper parts in the lens pattern portions 120, and the distance and the angle between the lens pattern portions 120 may satisfy predetermined conditions. Accordingly, the optical film 10 may improve the CR of a display device.

The amount by which the optical film 10 may improve the CR of a display device compared to the related-art optical film is shown in Table 1 below.

TABLE 1

|       | Related Art | Exemplary Embodiment of the Invention |
|-------|-------------|---------------------------------------|
| White | 440.9       | 456.6                                 |
| Black | 0.1225      | 0.1065                                |
| CR    | 3599        | 4289                                  |

Referring to Table 1, the optical film 10 may effectively improve the CR of a display device, compared to the related-art optical film.

The horizontal axis of FIG. 6 represents a gray level. And the vertical axis represents the luminance. Further, the reference numeral 610 of FIG. 6 represents a front gamma curve of the display device according to the related-art. The reference numeral 620 of FIG. 6 represents a side gamma curve of the display device according to the related-art. The reference numeral 630 of FIG. 6 represents a front gamma curve of the display device according to the exemplary embodiment of the invention. The reference numeral 640 of FIG. 6 represents a side gamma curve of the display device according to the exemplary embodiment of the invention.

Referring to FIG. 6, in the case of the side gamma curve 640 of the display device according to the embodiment of the present invention may be seen that the closer the front gamma curve 630 of the display device according to the embodiment of the present invention, compared to the related-art display device.

It is apparent from FIG. 6 that the optical film 10 may improve visibility due to a coupling of gamma curves at a location closer to the front thereof.

That is, the optical film 10 includes the lens pattern portions 120 the upper parts of which are removed because they do not much affect the improvement of visibility. Accordingly, the optical film 10 may further improve the CR of a display device and may also enhance visibility due to a coupling of gamma curves.

FIGS. 7(a)-7(d) are schematic views illustrating examples of the shape of the lens pattern portions 120 of the optical film 10 of FIG. 1.

Figure 7A:
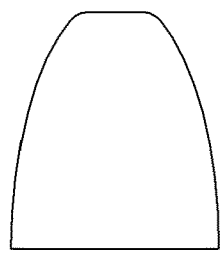
FIGS. 7(a)-7(d) are schematic views illustrating examples of the shape of a plurality of lens pattern portions of the optical film of FIG. 1.
Figure 7B:
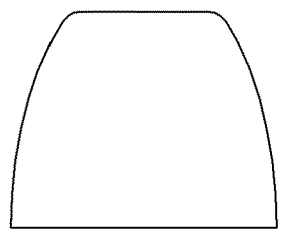
Figure 7C:
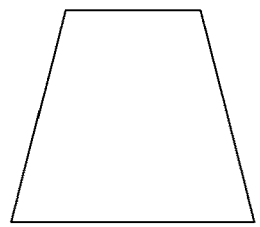
Figure 7D:
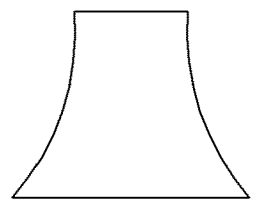

Referring to FIGS. 2 and 7(a)-7(d), the lens pattern portions 120 are not limited to a particular profile as long as they each have a first surface opposite to the first surface of the first base 110. That is, as illustrated in FIGS. 7(a) and 7(b), the lens pattern portions 120 may have a convex profile on either side thereof. In an alternative exemplary embodiment, as illustrated in FIG. 7(c), the lens pattern portions 120 may have a straight line profile on either side thereof. In an alternative exemplary embodiment, as illustrated in FIG. 7(d), the lens pattern portions 120 may have a concave profile on either side thereof. The length of the first surfaces of the lens pattern portions 120 is not particularly limited, as illustrated in FIGS. 7(a) and 7(d).

Figure 8:
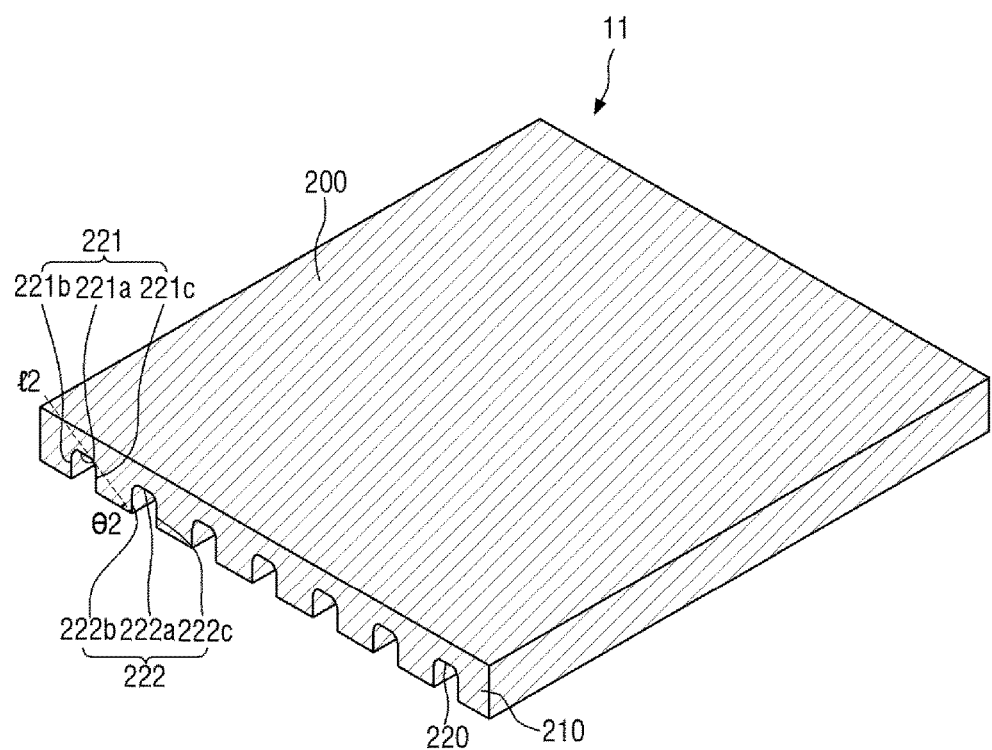
FIG. 8 is a perspective view of another exemplary embodiment of an optical film according to the invention.
Figure 9:
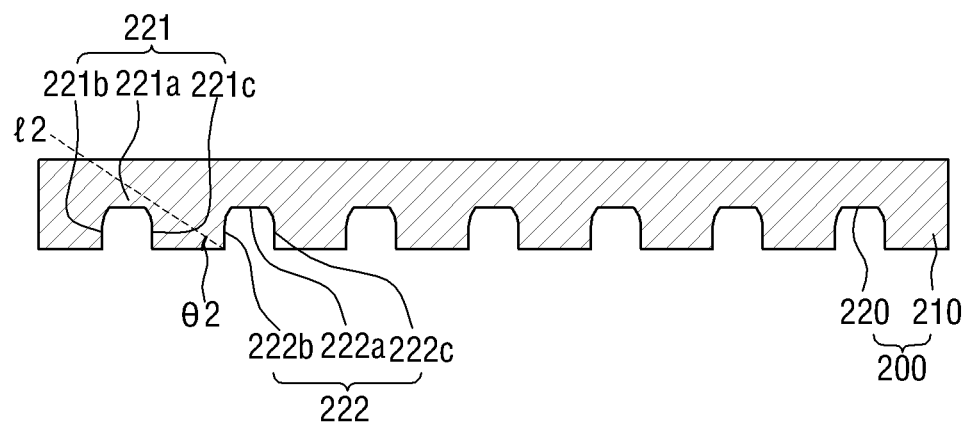
FIG. 9 is a cross-sectional view of the optical film of FIG. 8.

FIG. 8 is a perspective view of an optical film 11 according to another exemplary embodiment of the invention. FIG. 9 is a cross-sectional view of the optical film 11 of FIG. 8. The optical film 11 will hereinafter be described, focusing mainly on differences with the optical film 10 of FIGS. 1 to 7.

Referring to FIGS. 8 and 9, the optical film 11 may include a cover film 200 only. That is, the optical film 11, unlike the optical film 10 of FIGS. 1 to 7, does not include a base film 100.

The cover film 200 may include a second base 210, and a plurality of engraved pattern portions 220 may be engraved in the second base 220 to be spaced apart from one another. Each of the engraved pattern portions 220 may have a first surface and curved surfaces, which extend from both sides of the first surface. In an exemplary embodiment, the cover film 200 may have a refractive index of about 1.53 to about 1.57, for example.

The engraved pattern portions 220 may include a first engraved pattern portion 221 and a second engraved pattern portion 222. In an exemplary embodiment, the first engraved pattern portion 221 and the second engraved pattern portion 222 may be polygonal, semicircular and semielliptical in a cross-sectional view, for example.

The first engraved pattern portion 221 may include a first surface 221a, a first side surface 221b, and a second side surface 221c. In an exemplary embodiment, the first surface 221a may be provided to be in parallel to the second base 210, but the invention is not limited thereto. The first side surface 221b may extend from one side of the first surface 221a to a first surface of the second base 210. The second side surface 221c may extend from the other side of the first surface 221a to the first surface of the second base 210. In an exemplary embodiment, the first and second side surfaces 221b and 221c may be symmetrical in shape to each other, but the invention is not limited thereto. In an exemplary embodiment, the first and second side surfaces 221b and 221c may have a curved profile or a straight line profile, for example.

The second engraved pattern portion 222 may include a second surface 222a, a third side surface 222b, and a fourth side surface 222c. In an exemplary embodiment, the second surface 222a may be provided to be in parallel to the second base 210, but the invention is not limited thereto. The third side surface 222b may extend from one side of the second surface 222a to the first surface of the second base 210. The fourth side surface 222c may extend from the other side of the second surface 222a to the first surface of the second base 210. In an exemplary embodiment, the third and fourth side surfaces 222b and 222c may be symmetrical in shape to each other, but the invention is not limited thereto. The third and fourth side surfaces 222b and 222c may have a curved profile or a straight line profile. That is, the first engraved pattern portion 221 and the second engraved pattern portion 222 may have the same shape, the same length, and the same height.

When an imaginary line l2 is drawn between a point of contact between the first surface 221a and the second side surface 221c of the first engraved pattern portion 221 and a point of contact between the third side surface 222b of the second engraved pattern portion 222 and the first surface of the second base 210, a second angle θ2 between the imaginary line l2 and the first surface of the second base 210 may be greater than about 0° and less than about 50°, for example. Also, the distance between a point of contact between the second side surface 221c of the first engraved pattern portion 221 and the first surface of the second base 210 and a point of contact between the third side surface 222b of the second engraved pattern portion 222 and the first surface of the second base 210 may be greater than a value obtained by dividing the height of the first and second engraved pattern portions 221 and 222 by the tangent value of the second angle θ2.

In an exemplary embodiment, at least one of the depth and width of the engraved pattern portions 220 may be 10 micrometer (μm) or greater. More specifically, the engraved pattern portions 220 may have an aspect ratio of about 0.5 to about 1.6, for example. The aspect ratio of the engraved pattern portions 220 may be obtained by dividing the depth of the engraved pattern portions 220 by the width of the engraved pattern portions 220. Accordingly, when applied in a display device, the optical film 11, which satisfies the aforementioned aspect ratio and refractive index ranges, may increase the front luminance of the display device and at the same time, widen the side viewing angle of the display device.

Figure 10:
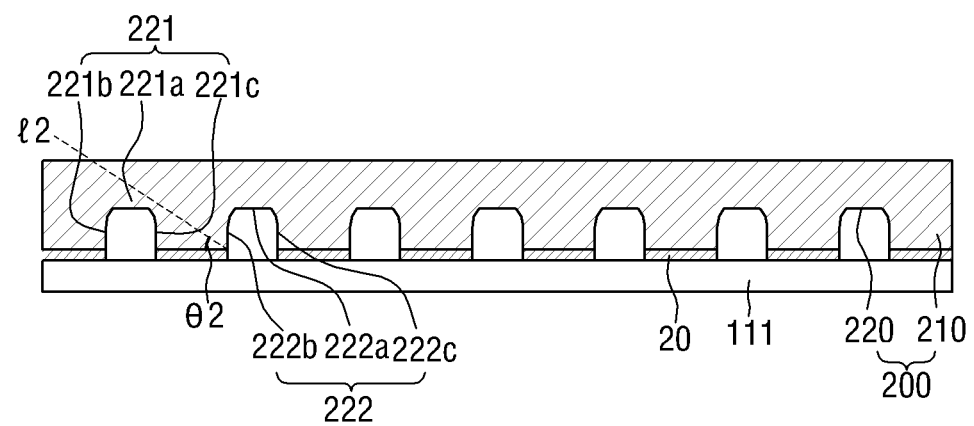
FIG. 10 is a cross-sectional view of a base film attached to the optical film of FIG. 8.

FIG. 10 is a cross-sectional view of a base film 111 attached to the optical film 11 of FIG. 8.

Referring to FIG. 10, the optical film 11 may be coupled to the base film 111 by an adhesive 20. The adhesive 20 may be disposed on parts of the cover film 200 where the engraved pattern portions 220 are not provided. Accordingly, the distortion or diffusion of light provided by a display panel 300 (refer to FIG. 11) may be prevented. The gap between the cover film 200 and the base film 111, i.e., the engraved pattern portions 220, may be filled with an air layer. The refractive index of the air layer may approximate 1. Accordingly, when applied in a display device, the optical film 11 may increase the front luminance of the display device and at the same time, widen the side viewing angle of the display direction due to the difference between the refractive index of the cover film 200 and the refractive index of the air layer and the aspect ratio of the engraved pattern portions 220.

Figure 11:
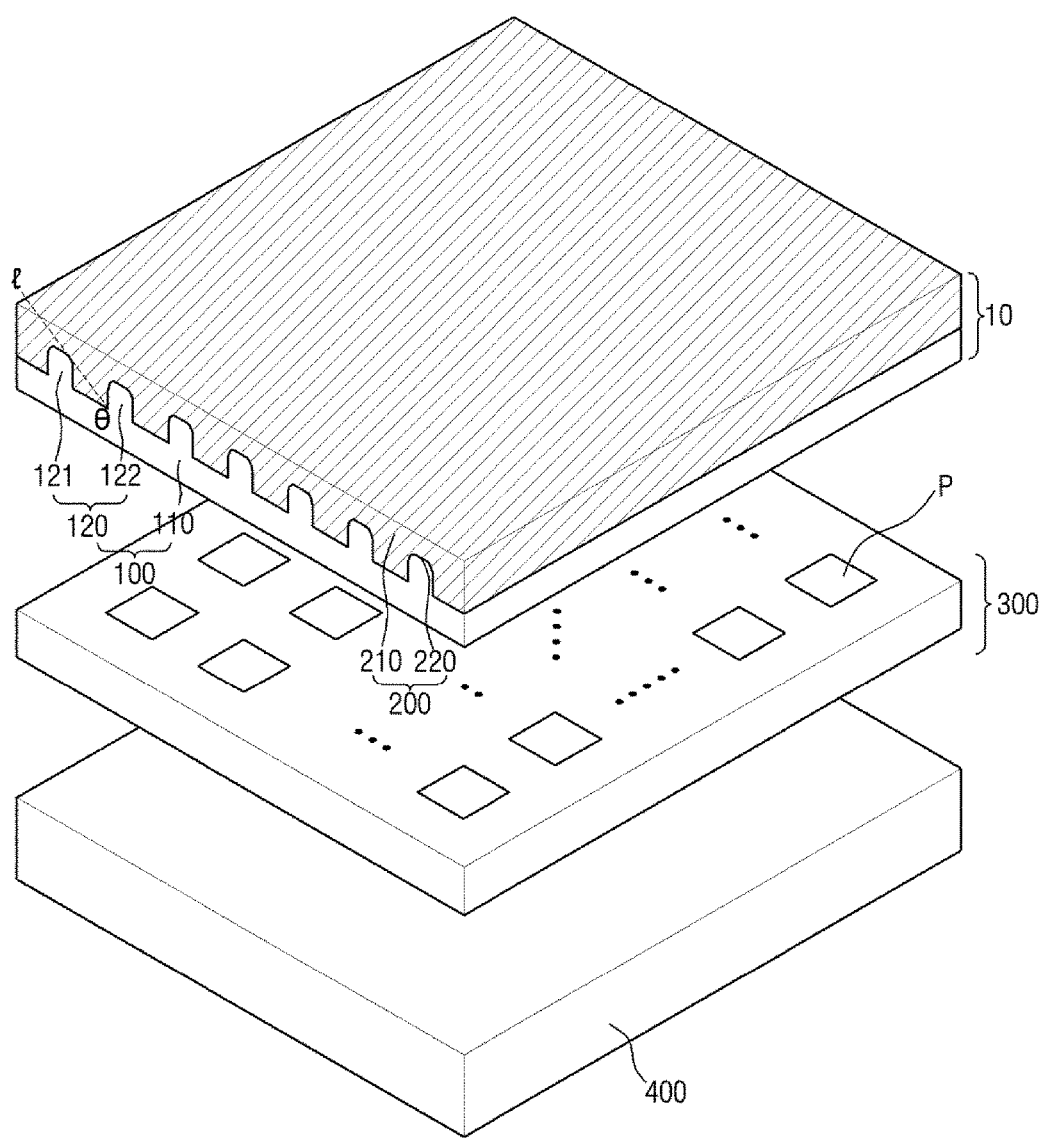
FIG. 11 is a perspective view of an exemplary embodiment of a display device according to the invention.
Figure 12:
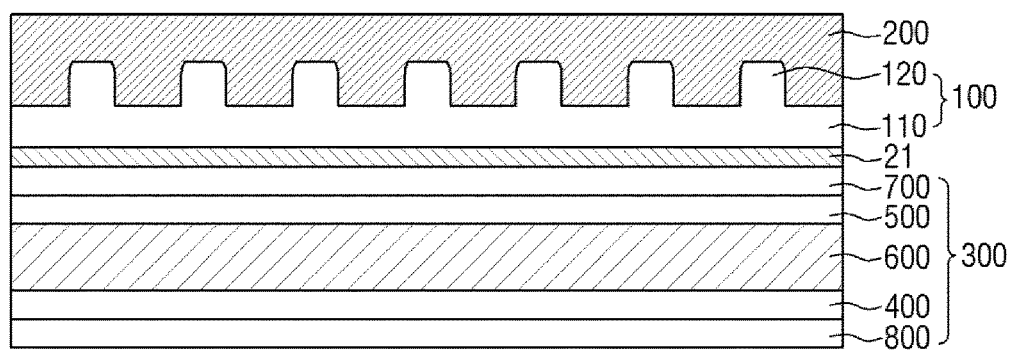
FIG. 12 is a cross-sectional view of the display device of FIG. 11.

FIG. 11 is a perspective view of a display device according to an exemplary embodiment of the invention. FIG. 12 is a cross-sectional view of a display device of FIG. 11. Detailed descriptions of parts and elements of the display device that have already been described above with reference to FIGS. 1 to 10 will be omitted.

Referring to FIGS. 11 and 12, the display device may include an optical film 10 and a display panel 300.

The optical film 10 may be disposed on the display panel 300. The optical film 10 may include a base film 100 and a cover film 200. The base film 100 may include a first base 110 and a plurality of lens pattern portions 120, which protrude from the first base 110 in a first direction. The base film 100 may have a different refractive index from that of the cover film 200. More specifically, the base film 100 may have a lower refractive index than that of the cover film 200. In an exemplary embodiment, the difference between the refractive index of the base film 100 and the refractive index of the cover film 200 may be about 0.03 to about 0.15, for example. Referring back to FIG. 2, the lens pattern portions 120 may include a first lens pattern portion 121 and a second pattern portion 122. The first lens pattern portion 121 may have a first surface 121a, a first side surface 121b, and a second side surface 121c. The second lens pattern portion 122 may have a second surface 122a, a third side surface 122b, and a fourth side surface 122c. When an imaginary line l is drawn between a point of contact between the first surface 121a and the second side surface 121c of the first lens pattern portion 121 and a point of contact between the third side surface 122b of the second lens pattern portion 122 and a first surface of the first base 110, a first angle θ between the imaginary line l and the first surface of the first base 110 may be greater than about 0° and less than about 50°, for example.

The display panel 300, which displays an image, may include a plurality of pixel units P. In an exemplary embodiment, the pixel units P may be arranged in a matrix on the display panel 300. That is, the pixel units P may be uniformly arranged in a horizontal direction and a vertical direction according to a predetermined rule. Each of the pixel units P may include a pixel for displaying an image, and the pixel may display one of red, green and blue, for example. In an exemplary embodiment, the display panel 300 may be a plasma display panel ("PDP"), a plasma addressed liquid crystal ("PALC") display panel, a liquid crystal display ("LCD") panel, or an organic light-emitting diode ("OLED") panel, for example. For convenience, it is assumed that the display panel 300 is an LCD panel.

The optical film 10 and the display panel 300 may be laminated together by a coupling member 21. The coupling member may be an adhesive. Examples of the adhesive may include at least one of an acrylic adhesive, a silicone-based adhesive, a urethane-based adhesive, a polyvinyl butyral adhesive, an ethylene-vinyl acetate-based adhesive, a polyvinyl ether resin, and a melamine resin. However, the coupling member 21 is not necessarily limited to the adhesive, and may include a resin ingredient. Accordingly, the optical film 10 and the display panel 300 may be laminated together by thermal curing, for example.

The display panel 300 may include an upper polarization plate 700, a first substrate 500, a liquid crystal layer 600, a second substrate 400, and a lower polarization plate 800. The liquid crystal layer 600 may be disposed between the first substrate 500 and the second substrate 400.

The upper polarization plate 700 may have a first surface on which the optical film 10 is deposited and a second surface which is opposite to the first surface. The upper polarization plate 700 may be attached to a location where an image displayed by the display device may be viewed by a viewer. The optical film 10 may be deposited on the first surface of the upper polarization plate 700. The transmission axis of the upper polarization plate 700 and the transmission axis of the lower polarization plate 800 may be orthogonal or parallel to each other. The lower polarization plate 800 may have a first surface on which the second substrate 400 is deposited and a second surface which is opposite to the first surface. Each of the upper polarization plate 700 and the lower polarization plate 800 may include a polarizer protective film and a polarizer.

The first substrate 500 may have a first surface on which the upper polarization plate 700 is deposited and a second surface which is opposite to the first surface. In an exemplary embodiment, the first substrate 500 may be a thin-film transistor ("TFT") array substrate, for example. Liquid crystal display electrodes, wiring patterns, TFTs, and an alignment layer may be disposed on the first substrate 500. In an exemplary embodiment, the first substrate 500 may include a base, which includes a transparent insulating material such as glass or plastic, TFTs, which each include a gate electrode, a gate insulating layer, a semiconductor layer, an ohmic contact layer, and source and drain electrodes, and pixel electrodes, for example.

The second substrate 400 may have a first surface on which the liquid crystal layer 600 is deposited and a second surface which is opposite to the first surface. Color filters, a common electrode, and an alignment layer may be disposed on the surface of the second substrate 400 facing the first substrate 500, and a black matrix ("BM") may also be disposed on the second substrate 400, when necessary. In an exemplary embodiment, the second substrate 400 may include a base, which includes a transparent insulating material such as glass or plastic, a BM, which is disposed on the bottom of the base to prevent light leakage, red, green, and blue color filters, and a common electrode, for example.

In an exemplary embodiment, the first substrate 500 and the second substrate 400 may include plastic such as polyethylene terephthalate ("PET"), polycarbonate ("PC"), polyimide ("PI"), polyethylene naphthalate ("PEN"), polyether sulfone ("PES"), polyacrylate ("PAR") or cyclic olefin copolymer ("COC"), for example, but the invention is not limited thereto. The first substrate 500 and the second substrate 400 may include a flexible material.

When the display panel 300 is an LCD panel, an operating mode of the display panel 300 may be a twisted nematic ("TN") mode or an electrically-controlled birefringence ("ECB") mode. Examples of the ECB mode include a vertical alignment ("VA") mode, an optically compensated bend ("OCB") mode, and an in-plane switching ("IPS") mode, for example. In the TN mode, liquid crystal molecules in the LCD panel 300 may be aligned such that their long axes may be in parallel to the surfaces of the first substrate 500 and the second substrate 400 in the absence of an electric field in the LCD panel 300 because of no voltage difference between the pixel electrodes and the common electrode, i.e., between the field-generating electrodes. Also, the liquid crystal molecules may be 90° spirally twisted between the first substrate 500 and the second substrate 400. When passing through the liquid crystal layer 500 of the LCD panel 300, linearly polarized light may be transformed due to retardation caused by the dielectric anisotropy ($\Delta\varepsilon$) of the liquid crystal molecules. By adjusting the dielectric anisotropy ($\Delta\varepsilon$) and the chiral pitch of the liquid crystal molecules or the depth (i.e., the cell gap) of the LCD panel 300, linearly polarized light transmitted through the LCD panel 300 may be made to rotate by 90°.

The display device may also include a backlight unit 40, which is disposed below the display panel 300.

When the display panel 300 is an LCD panel, the display panel 300 may be of a "passive pixel" type. Accordingly, the backlight unit 40, which supplies light to the display panel 300, may be provided below the display panel 300. In response to the backlight unit 40 supplying light, the display panel 300 may be able to display various images, and this will hereinafter be described later in detail with reference to FIGS. 13 and 14.

Figure 13:
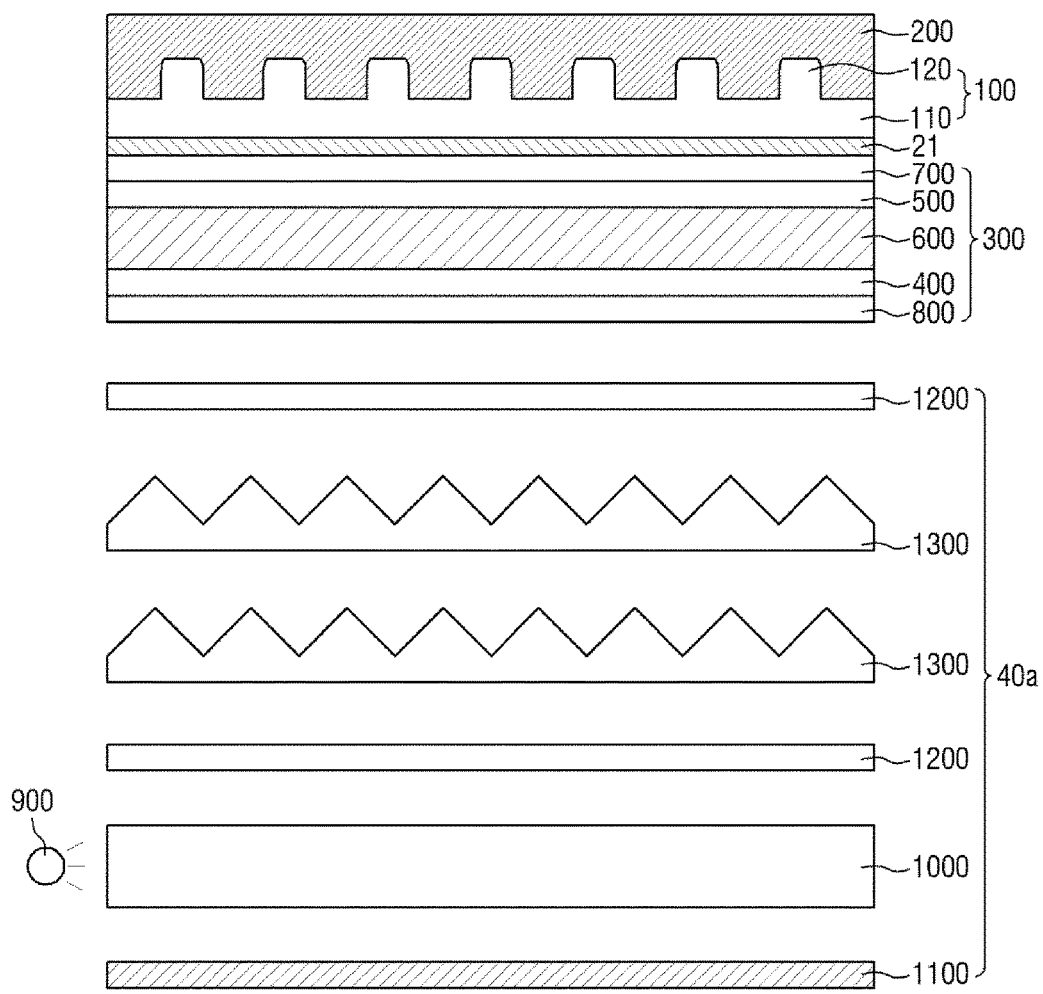
FIGS. 13 and 14 are detailed cross-sectional views of the display device of FIG. 11.
Figure 14:
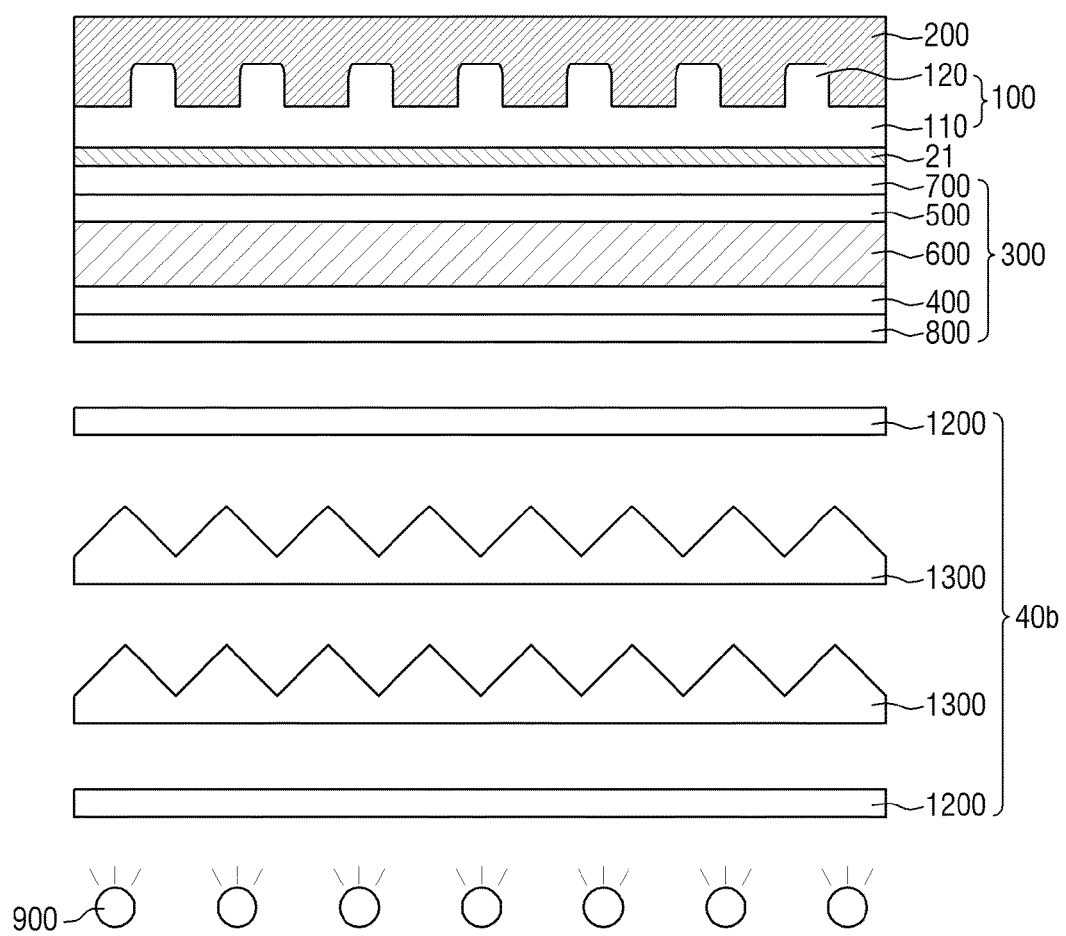

FIGS. 13 and 14 are detailed cross-sectional views of the display device of FIG. 11. More specifically, FIG. 13 illustrates a case when the display device includes an edge-type backlight unit 40a, and FIG. 14 illustrates a case when the display device includes a direct-type backlight unit 40b.

Referring to FIG. 13, the display device may include the edge-type backlight unit 40a. Accordingly, the display device may include at least one light source 900, a light guide plate ("LGP") 1000, which is disposed on a side of the light source 900 and guides light emitted from the light source 900 upward, and an optical plate 1200 or 1300, which is disposed between the light source 900 and the display panel 300. A reflective sheet 1100 may be disposed at the bottom of the LGP 1000. The light source 900 may be disposed on at least one side of the LGP 1000. In an exemplary embodiment, a light-emitting diode ("LED"), a cold cathode fluorescent lamp ("CCFL"), a hot cathode fluorescent lamp ("HCFL"), or an external electrode fluorescent lamp ("EEFL") may be used as the light source 900, for example. The LGP 1000 may allow light emitted from the light source 900 to travel therewithin through total reflection and may then allow the light to be reflected from, for example, diffusion patterns, which are disposed on the bottom surface of the LGP 1000, and to be emitted upward. The reflective sheet 1100 may be disposed below the LGP 1000 and may reflect light emitted downward from the LGP 1000 upward. The optical plate 1200 or 1300 may be disposed on the LGP 1000 lens pattern portions. The optical plates 1200 and 1300 may include a diffusion sheet 1200 and a prism sheet 1300. The diffusion sheet 1200 may transmit some of light emitted from the light source 900 to the display panel 300, which is disposed above the diffusion sheet 1200, by diffusing the light and may reflect the rest of the light downward. In an exemplary embodiment, the diffusion sheet 1200 may include at least one of polymethyl methacrylate ("PMMA"), polystyrene ("PS"), PC, COC, PET, polybutylene terephthalate ("PBT"), and a plastic alloy—for example, but the invention is not limited thereto. The optical plate 1200 or 1300 may also include a micro-lens array film, a lenticular lens film, and the like, when necessary, and the arrangement of the sheets and/or the films in the optical plate 1200 or 1300 may vary.

Referring to FIG. 14, the display device may include the direct-type backlight unit 40b. The display device may further include at least one light source 900 and an optical plate 1200 or 1300, which is disposed between the light source 900 and the display panel 300. The display device may allow light emitted from the light source 900, which is disposed at a lower part of the display device, to be uniformly diffused by a diffusion sheet 1200 and collected by a prism sheet 1300 and thus to travel toward the display panel 300.

Although not specifically illustrated, the backlight unit 40a of FIG. 13 or the backlight unit 40b of FIG. 14 may be received by a bottom chassis, and the display panel 300 may be received on a middle frame and may be fixed by a top chassis from thereabove.

Figure 15:
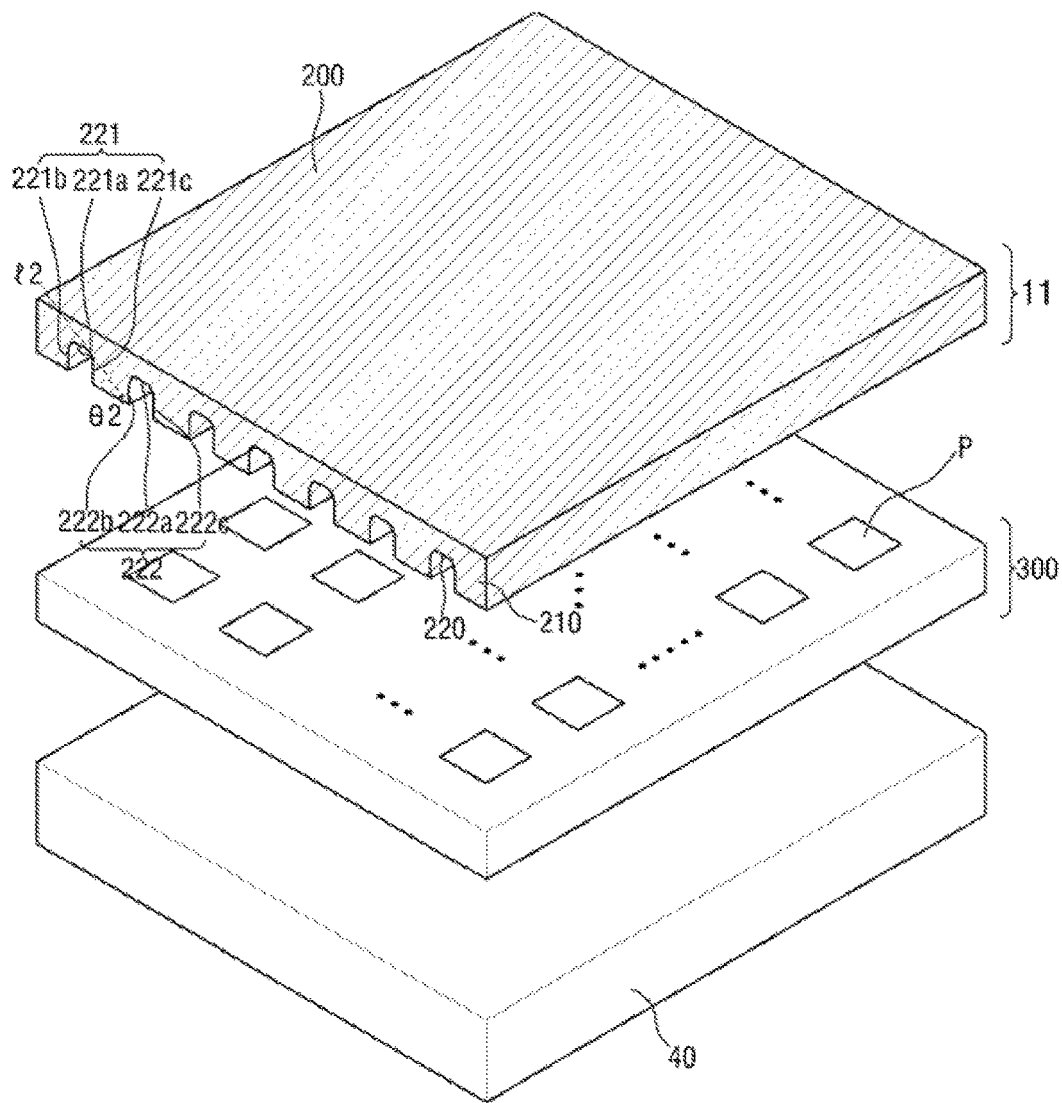
FIG. 15 is a perspective view of another exemplary embodiment of a display device according to the invention.
Figure 16:
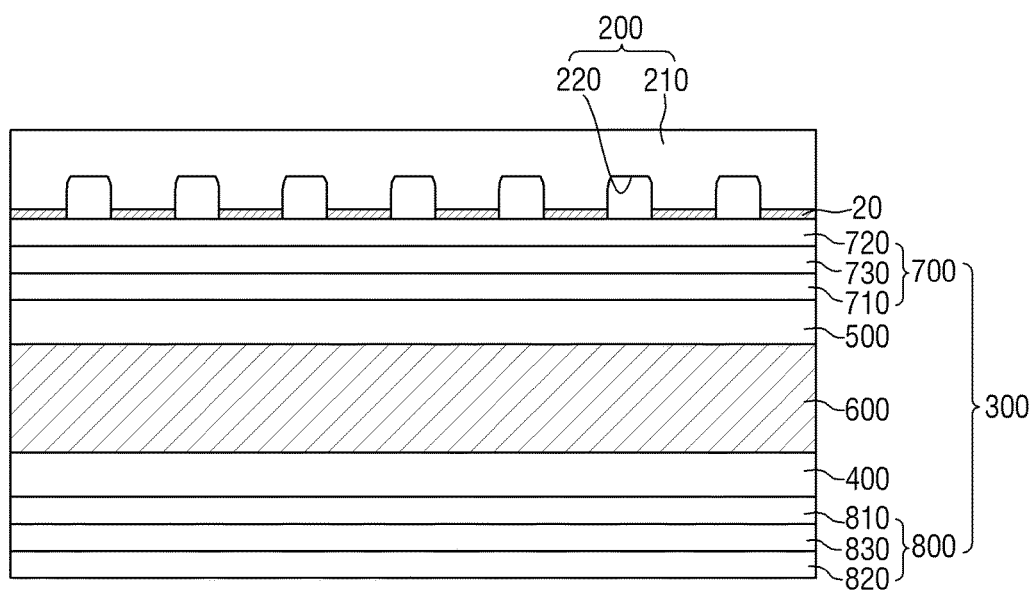
FIG. 16 is a cross-sectional view of the display device of FIG. 15.

FIG. 15 is a perspective view of a display device according to another exemplary embodiment of the invention. FIG. 16 is a cross-sectional view of the display device of FIG. 15. The display device of FIG. 15 differs from the display device of FIG. 11 only in that an optical film 11 thereof includes a cover film 200 only.

Referring to FIGS. 15 and 16, the display device may include the optical film 11, which includes the cover film 200, a display panel 300, and a backlight unit 40.

The cover film 200 may include a second base 210, and a plurality of engraved pattern portions 220 may be engraved in the second base 220 to be spaced apart from one another. In an exemplary embodiment, the cover film 200 may have a refractive index of about 1.53 to about 1.57, for example. The engraved pattern portion 220 may include a first engraved pattern portion 221 and a second engraved pattern portion 222. The first engraved pattern portion 221 may have a first surface 221a, a first side surface 221b, and a second side surface 221c. The second engraved pattern portion 222 may have a first surface 222a, a third side surface 222b, and a fourth side surface 222c. When an imaginary line l2 is drawn between a point of contact between the first surface 221a and the second side surface 221c of the first engraved pattern portion 221 and a point of contact between the third side surface 222b of the second engraved pattern portion 222 and a first surface of the second base 210, a second angle θ2 between the imaginary line l2 and the first surface of the second base 210 may be greater than about 0° and less than about 50°, for example. Also, the distance between a point of contact between the second side surface 221c of the first engraved pattern portion 221 and the first surface of the second base 210 and a point of contact between the third side surface 222b of the second engraved pattern portion 222 and the first surface of the second base 210 may be greater than a value obtained by dividing the height of the first and second engraved pattern portions 221 and 222 by the tangent value of the second angle θ2.

In an exemplary embodiment, at least one of the depth and width of the engraved pattern portions 220 may be 10 μm or greater, for example. More specifically, the engraved pattern portions 220 may have an aspect ratio of about 0.5 to about 1.6, for example. The aspect ratio of the engraved pattern portions 220 may be obtained by dividing the depth of the engraved pattern portions 220 by the width of the engraved pattern portions 220. Accordingly, when applied in a display device, the optical film 11, which satisfies the aforementioned aspect ratio and refractive index ranges, may increase the front luminance of the display device and at the same time, widen the side viewing angle of the display device.

In an exemplary embodiment, the upper polarization plate 700 may have a multi layer structure including plates 710, 720 and 730. Similarly, the lower polarization plate 800 may have a multi layer structure including plates 810, 820 and 830.

Although certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. An optical film comprising:
a base film including a base and first and second lens pattern portions, which protrude from a surface of the base in a first direction and spaced apart from each other in a second direction orthogonal to the first direction; and
a cover film disposed on the base film,
wherein:
the first lens pattern portion includes a first surface, a first side surface, which extends from one side of the first surface to the surface of the base, and a second side surface, which extends from the other side of the first surface and the surface of the base,
the second lens pattern portion includes a second surface, a third side surface, which extends from one side of the second surface to the surface of the base, and a fourth side surface, which extends from the other side of the second surface and the surface of the base,
an angle between an imaginary line, which is drawn from a point of contact between the second side surface and the first surface and a point of contact between the third side surface and the surface of the base, and the surface of the base is less than about 50 degrees, and
the surface of the base is exposed extending in the second direction between a first point of contact between the second side surface and the surface of the base and a second point of contact between the third side surface and the surface of the base continuously along at least a substantial length defining the surface of the base.

2. The optical film of claim 1, wherein a refractive index of the base film is lower than a refractive index of the cover film.

3. The optical film of claim 1, wherein a difference between a refractive index of the cover film and a refractive index of the base film is about 0.03 to about 0.2.

4. The optical film of claim 1, wherein a distance from a point of contact between the second side surface and the surface of the base to a point of contact between the third side surface and the surface of the base is proportional to a height of the first lens pattern portion and inversely proportional to the angle.

5. The optical film of claim 1, wherein the cover film comprises first and second engraved pattern portions, which contact the first and second lens pattern portions.

6. The optical film of claim 1, wherein when the base film has a refractive index of about 1.2 to about 1.6, the cover film has a refractive index of about 1.5 to about 2, and the angle is about 40 degrees or lower.

7. An optical film comprising:
a cover film in which first and second engraved pattern portions are defined and spaced apart from each other,
wherein:
the first engraved pattern portion includes a first surface, a first side surface, which extends from one side of the first surface to a surface of the cover film, and a second side surface, which extends from the other side of the first surface and the surface of the cover film,
the second engraved pattern portion includes a second surface, a third side surface, which extends from one side of the second surface to the surface of the cover film, and a fourth side surface, which extends from the other side of the second surface and the surface of the cover film,
an angle between an imaginary line, which is drawn from a point of contact between the second side surface and the first surface and a point of contact between the third side surface and the surface of the cover film, the surface of the cover film is less than about 50 degrees, and the surface of the cover film is exposed extending in a direction parallel to opposing major surface planes defining the cover film between a first point of contact between the second side surface and the surface of the cover film and a second point of contact between the third side surface and the surface of the cover film continuously along at least a substantial length defining the surface of the cover film.

8. The optical film of claim 7, wherein a refractive index of the cover film is about 1.53 to about 1.57.

9. The optical film of claim 7, wherein a distance from a point of contact between the second side surface and the surface of the cover film to a point of contact between the third side surface and the surface of the cover film is greater than a value obtained by dividing a height of the first engraved pattern portion by a tangent value of the angle.

10. The optical film of claim 7, further comprising:
a base film disposed on the surface of the cover film.

11. The optical film of claim 10, further comprising:
an air layer filling gaps between the base film and the first and second engraved pattern portions.

12. The optical film of claim 11, wherein a refractive index of the cover film is higher than a refractive index of the air layer.

13. A display device comprising:
a display panel; and
an optical film comprising a base film, including a base and first and second lens pattern portions, which protrude from a surface of the base in a first direction and spaced apart from each other in a second direction orthogonal to the first direction, and a cover film disposed on the base film and having a different refractive index from that of the base film,
wherein:
the first lens pattern portion includes a first surface, a first side surface, which extends from one side of the first surface to the surface of the base, and a second side surface, which extends from the other side of the first surface and the surface of the base,
the second lens pattern portion includes a second surface, a third side surface, which extends from one side of the second surface to the surface of the base, and a fourth side surface, which extends from the other side of the second surface and the surface of the base,
an angle between an imaginary line, which is drawn from a point of contact between the second side surface and the first surface and a point of contact between the third side surface and the surface of the base, and the surface of the base is less than about 50 degrees, and
the surface of the base is exposed extending in the first direction between a first point of contact between the second side surface and the surface of the base and a second point of contact between the third side surface and the surface of the base continuously along at least a substantial length defining the surface of the base.

14. The display device of claim 13, wherein a distance from a point of contact between the second side surface and a surface of the cover film to a point of contact between the third side surface and the surface of the cover film is proportional to a height of the first lens pattern portion and inversely proportional to the angle.

15. The display device of claim 13, wherein a distance from a point of contact between the second side surface and the surface of the cover film to a point of contact between the third side surface and the surface of the cover film is greater than a value obtained by dividing a height of the first engraved pattern portion by a tangent value of the angle.

16. The display device of claim 13, wherein a refractive index of the cover film is higher than a refractive index of the base film.

17. The display device of claim 13, wherein a refractive index of the cover film is about 1.53 to about 1.57 and a refractive index of the base film is about 1.42 to about 1.5.

18. The display device of claim 13, wherein when the base film has a refractive index of about 1.2 to about 1.6 and the cover film has a refractive index of about 1.5 to about 2, the angle is about 40 degrees or lower.

19. The display device of claim 13, wherein the first and second lens pattern portions are polygonal, semicircular, semielliptical in a cross-sectional view.

20. The display device of claim 13, wherein the first and second lens pattern portions have an aspect ratio of about 0.5 to about 1.6.

* * * * *